Aug. 7, 1951      P. A. SCHMIDT      2,563,377
WIRE HANDLING APPARATUS
Filed Dec. 16, 1946
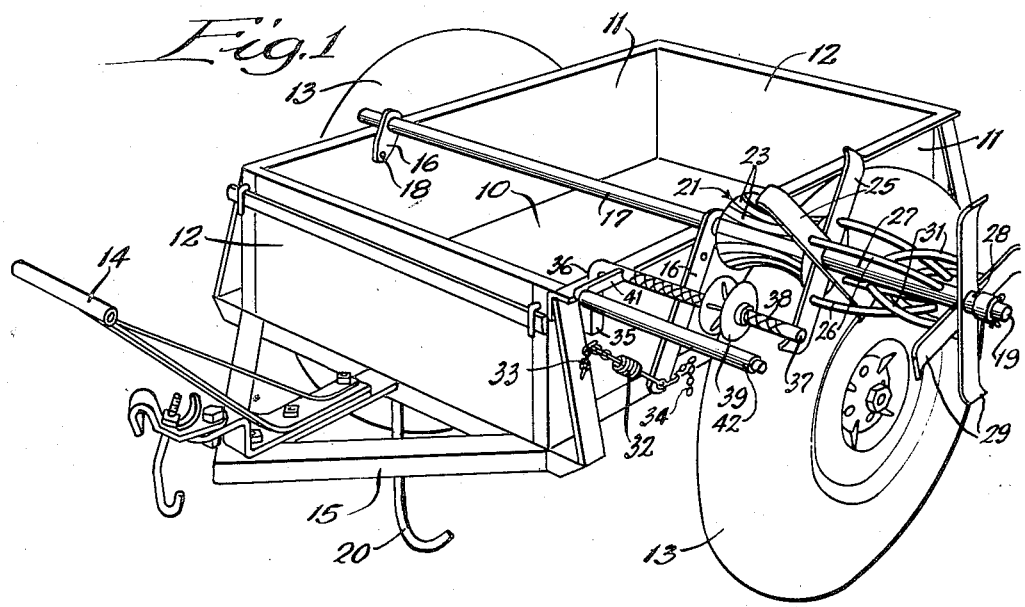
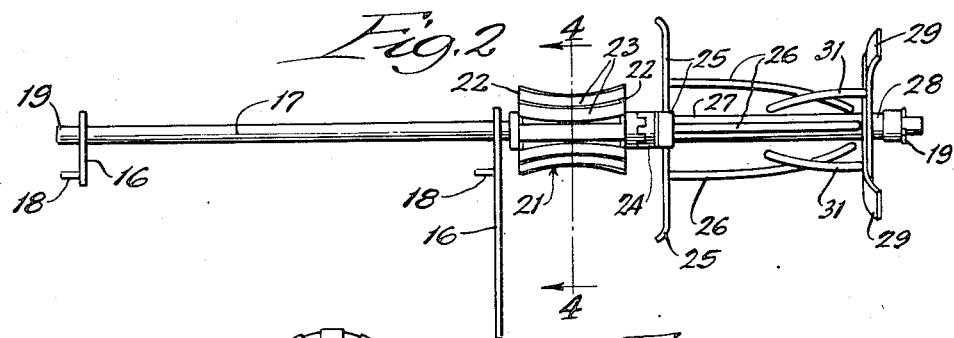
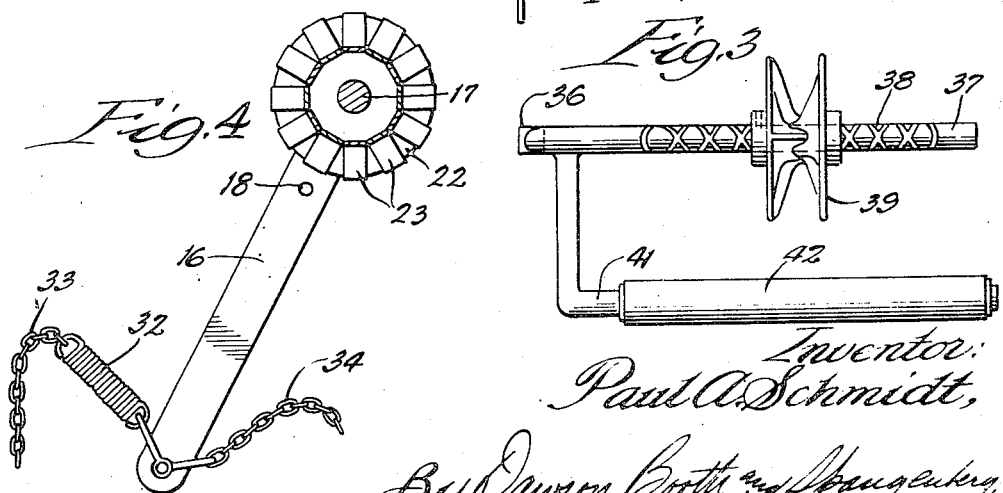
Inventor:
Paul A. Schmidt,
By Dawson, Booth and Spangenberg
Attorneys.

UNITED STATES PATENT OFFICE 2,563,377

WIRE HANDLING APPARATUS

Paul A. Schmidt, Earlville, Ill.

Application December 16, 1946, Serial No. 716,507

3 Claims. (Cl. 242—92)

This invention relates to wire handling apparatus and more particularly to apparatus for winding and unwinding strands of barbed wire or like fence wire in farms and similar locations.

One of the objects of the invention is to provide wire handling apparatus which is carried on a wheeled cart to be drawn in any desired manner to wind or unwind strands of wire in fields and similar locations.

Another object is to provide wire handling apparatus in which the wire winding and unwinding parts are easily demountable from the cart so that the cart can be used for general utility purposes.

Still another object is to provide wire handling apparatus which includes a level winding mechanism detachably mounted on the cart to guide the wire evenly on its reel.

A further object is to provide wire handling apparatus in which the tension of the wire being wound can be easily and quickly adjusted and will be maintained constant as adjusted.

The above and other objects and advantages of the invention will be more readily apparent from the following description when read in connection with the accompanying drawing, in which—

Figure 1 is a perspective view of a wire handling apparatus embodying the invention;

Figure 2 is a side elevation of the supporting means and shaft detached from the cart;

Figure 3 is a top plan view of the level winding mechanism detached from the cart; and Figure 4 is a section on the line 4—4 of Fig. 2.

The apparatus, as shown, comprises a generally rectangular cart having a body formed by a floor 10, upstanding parallel side walls 11, and end walls 12. The cart is supported on a pair of wheels indicated generally at 13 which are preferably equipped with resilient tires such as conventional pneumatic tires. The wheels may be supported on a cross axle extending transversely under the cart body and lying closely adjacent the opposite sides of the body, as shown.

The cart may be drawn in any desired manner as, for example, manually through a handle 14 extending upwardly and forwardly from one end of the body. For drawing the cart by power such as by a tractor, a frame 15 is provided at the forward end of the cart which may carry suitable coupling means for attachment to a tractor or the like. The cart may also carry a pivoted leg 20 to provide a rest for holding the cart body in a generally horizontal position so that it will stand upright without additional support.

The wire winding apparatus comprises a support formed of a pair of parallel arms 16 one of which is preferably longer than the other, as shown, and which are rigidly connected to a rod or shaft 17. Each of the arms 16 carries an outwardly extending pivot pin 18, and the pivot pins are adapted to fit into openings in the cart side walls 11. The support may be held against accidental removal from the cart by dropping a cotter pin or the like through a suitable opening in one or both of the pivot pins.

At one end, the shaft 17 projects beyond the support and rotatably carries a wheel-engaging roller 21 which is adapted to engage the periphery of one of the wheels 13. As shown, the roller is formed by a pair of circular end plates 22 which are connected by inwardly bent straps 23. The straps are spaced at their ends to form a relatively open structure which will not easily retain mud so that a good frictional engagement will be obtained at all times between the roller and the tire of one of the wheels.

Beyond the roller, the shaft 17 is adapted to carry a wire receiving reel. The reel may obviously be of any desired type but is shown as constructed in accordance with my copending application Serial No. 725,188 filed January 30, 1947, now Patent No. 2,489,108 issued November 22, 1949. The reel comprises a hub member 24 adapted to fit rotatably over the shaft and to be connected to the roller 21 by clutch teeth, as shown. The hub carries crossed arms 25 which are rigidly secured to the hub and extend outwardly therefrom. Rods 26 are secured to the arms extending generally axially and turning inwardly at their outer ends. The hub also carries a tube or pipe 27 which fits over the shaft 17 and may be held thereon by a cotter pin 19. The reel is completed by a second hub 28 carrying crossed arms 29 which, in turn, carry short arms 31 extending generally axially and bent slightly inwardly. The hub 28 may be inserted on the tube 27 and secured by a set screw or the like in abutting relation to the outer ends of the rods 26. The rods 31 and 26 interfit with each other, as shown, and form a surface on which strands of wire may be wound. When the reel is filled, the wire can easily be removed simply by removing the hub 28 and sliding the wire off of the rods 26.

When the apparatus, as described, is mounted on the cart, the roller 21 is adapted to be yieldingly urged into engagement with the wheel. For this purpose, the longer arm 16 has a tension spring 32 connected to its lower end and a chain 33 formed of open links for connection to the outer end of the spring. Any desired one of the chain links may be hooked over a pin on the adjacent cart side so that the spring tension can easily be adjusted. The spring acts yieldingly to rock the support in a direction to press the roller against the wheel so that it will be driven as the wheel turns during motion of the cart. The cart is drawn forwardly during a winding operation so that the tension of the wire as it is wound on the reel tends to rock the support forward against the action of the spring to move the roller away from the wheel. Therefore, by adjusting the tension of the spring, the tension under which wire will be wound can easily be adjusted and will be kept constant during a winding operation in accordance with the adjusted spring tension.

For limiting the pressure which can be applied between the roller and wheel and also for holding the roller away from the wheel during unwinding operation, a second chain 34 is connected to the lower end of the long lever 16. The chain 34 can be hooked over a pin on the adjacent side 11 so that it will limit swinging of the support in a direction to move the roller toward the wheel. By this means, pressure of the roller against the wheel can be positively limited, and by properly connecting the chain 34 to its pin, the roller can be held out of contact with the wheel so that wire can be unwound from the reel.

The wire is adapted to be laid evenly on the reel during a winding operation by a level winding mechanism detachably supported on the cart. For this purpose, the cart carries a square or other non-circular vertical socket 35 into which the square end 36 of a level winding frame may be detachably inserted. The level winding frame includes a rod or shaft 37 extending horizontally in front of the reel and formed with crossed threads 38 to cause a flanged guide wheel 39 to ride back and forth on the shaft 37 in a manner which will be readily understood. A second shaft or rod 41 is rigidly connected to the shaft 37 to lie horizontally in front of it and carries an elongated roller 42. In a winding operation, the wire will pass over the roller 42 through the guide wheel 39 and onto the reel so that the roller will prevent excessive pressure of the wire against the guide wheel and the guide wheel can guide the wire evenly onto the reel.

It will be seen that with the construction of the present invention all of the parts for winding or unwinding wire can easily and quickly be detached from and attached to the cart. In this way, the cart can be used for general utility purposes when the winding apparatus is detached from it and can serve to carry extra rolls of wire during a winding or unwinding operation.

While one embodiment of the invention has been shown and described in detail herein, it will be understood that this is illustrative only and is not intended to be taken as a definition of the scope of the invention, reference being had for this purpose to the appended claims.

What is claimed is:

1. Wire handling apparatus comprising a cart having a body supported on ground engaging wheels, supporting means pivoted on the cart on an axis parallel to the wheel axis, a shaft carried by the support parallel to the wheel axis and displaced from the pivotal axis of the support, a roller on the shaft to engage one of the wheels to be driven thereby as the cart is drawn over the ground, the roller being formed by circular end plates connected by circumferentially spaced inwardly curved flat straps to engage the periphery of a pneumatic tire on the wheel, and a spring to urge the support in a direction to press the roller against a wheel.

2. Wire handling apparatus comprising a cart body having parallel upstanding sides, a pair of wheels on a common axis transverse to the sides and lying adjacent the sides respectively, supporting means including a pair of levers formed for detachable pivotal connection to the sides on a common axis parallel to the wheel axis, a shaft carried by the levers parallel to the wheel axis, a roller carried by the shaft drivably to engage a wheel, the shaft being formed to carry a wire receiving reel in driving engagement with the roller an extension on one of the levers projecting beyond its pivotal connection to the cart side, a spring connected to the free end of said extension, a chain connected to the spring, and a pin on the adjacent side to fit into a selected link of the chain thereby to adjust the spring tension so that the spring can urge the support in a direction to press the roller against the wheel with a variable force.

3. In a wire handling apparatus, a shaft, means mounting the shaft for bodily movement toward and away from a wheel, and a roller on the shaft for driving engagement with the wheel, the roller being formed by circular end plates connected by circumferentially spaced inwardly curved flat strips to engage the periphery of the wheel.

PAUL A. SCHMIDT.

REFERENCES CITED

The following references are of record in the file of this patent:

UNITED STATES PATENTS

| Number | Name | Date |
|---|---|---|
| 263,445 | Tuttle | Aug. 29, 1882 |
| 286,218 | Murphey | Oct. 9, 1883 |
| 551,141 | McNutt | Dec. 10, 1895 |
| 808,424 | Wyckoff et al. | Dec. 26, 1905 |
| 845,545 | Hadland | Feb. 26, 1907 |
| 1,255,872 | Fentress | Feb. 12, 1918 |
| 1,823,212 | Saunders | Sept. 15, 1931 |